United States Patent
Cole et al.

(10) Patent No.: US 12,352,987 B2
(45) Date of Patent: Jul. 8, 2025

(54) SUBSTRATE-TRANSFERRED STACKED OPTICAL COATINGS

(71) Applicants: Thorlabs, Inc., Newton, NJ (US); Universität Wien, Vienna (AT)

(72) Inventors: Garrett Cole, Santa Barbara, CA (US); Valentin Wittwer, Bannwil (CH); Lukas W. Perner, Vienna (AT); Georg Winkler, Klosterneuburg-Weidling (AT); Aline Mayer, Zürich (CH); Oliver Heckl, Vienna (AT); David Follman, Niskayuna, NY (US)

(73) Assignee: Thorlabs, Inc., Newton, NJ (US)

( * ) Notice: Subject to any disclaimer, the term of this patent is extended or adjusted under 35 U.S.C. 154(b) by 749 days.

(21) Appl. No.: 17/683,776

(22) Filed: Mar. 1, 2022

(65) Prior Publication Data
US 2022/0187515 A1  Jun. 16, 2022

Related U.S. Application Data

(63) Continuation-in-part of application No. 16/128,503, filed on Sep. 11, 2018, now Pat. No. 11,365,492.

(51) Int. Cl.
*G02B 5/08* (2006.01)
*G02B 1/12* (2006.01)

(52) U.S. Cl.
CPC ............ *G02B 5/0866* (2013.01); *G02B 1/12* (2013.01); *G02B 5/0883* (2013.01)

(58) Field of Classification Search
None
See application file for complete search history.

(56) References Cited

U.S. PATENT DOCUMENTS

| | | | |
|---|---|---|---|
| 4,142,958 | A | 3/1979 | Wei et al. |
| 9,945,996 | B2 | 4/2018 | Aspelmeyer et al. |
| 2002/0030198 | A1 | 3/2002 | Coman et al. |
| 2005/0040212 | A1 | 2/2005 | Yang |
| 2005/0285128 | A1 | 12/2005 | Scherer et al. |

(Continued)

FOREIGN PATENT DOCUMENTS

| | | |
|---|---|---|
| EP | 2 607 935 A1 | 6/2013 |
| EP | 2645429 A1 | 10/2013 |

(Continued)

OTHER PUBLICATIONS

Communication pursuant to Article 94(3) EPC issued by the European Patent Office for European Patent Application No. 16 199 794.5, dated Apr. 20, 2020.

(Continued)

*Primary Examiner* — David Sample
(74) *Attorney, Agent, or Firm* — Myers Wolin, LLC

(57) ABSTRACT

A method for manufacturing hybrid optical coatings and hybrid mirror assemblies, including: a) providing a first optical coating having layers of alternating high and low refractive indices of crystalline materials on a first host substrate via an epitaxial growth technique; b) providing a second optical coating having layers of alternating high and low refractive indices of dielectric materials on a second host substrate via a physical vapor deposition (PVD) technique; c) directly bonding the first optical coating to the second optical coating; and d) removing the first host substrate.

13 Claims, 11 Drawing Sheets

(56) References Cited

U.S. PATENT DOCUMENTS

| | | | |
|---|---|---|---|
| 2009/0278233 | A1 | 11/2009 | Pinnington et al. |
| 2014/0063606 | A1 | 3/2014 | Aspelmeyer et al. |
| 2014/0064315 | A1 | 3/2014 | Dummer et al. |
| 2015/0083202 | A1 | 3/2015 | Ghyselen et al. |
| 2017/0149211 | A1* | 5/2017 | Jeong .................. H10H 20/841 |
| 2019/0271899 | A1* | 9/2019 | Zhang .................. H01S 3/1112 |
| 2020/0080231 | A1 | 3/2020 | Cole et al. |

FOREIGN PATENT DOCUMENTS

| | | |
|---|---|---|
| EP | 3 219 832 A1 | 9/2017 |
| EP | 3219834 | 9/2017 |
| GB | 2 346 480 A | 8/2000 |

OTHER PUBLICATIONS

Cole et al., "Tenfold reduction of Brownian noise in high-reflectivity optical coatings", Nature Photonics, Aug. 1, 2013; pp. 644-650, vol. 7, No. 8.

Babic et al., "Analytic Expressions for the Reflection Delay, Penetration Depth, and Absorptance of Quarter-Wave Dielectric Mirrors", IEEE Journal of Quantum Electronics, Feb. 1992, pp. 514-524, vol. 28, No. 2.

Winkler, et al., "Mid-infrared interference coatings with excess optical loss below 10 ppm", Optica, May 2021, pp. 686-696, vol. 8, No. 5.

Office Action issued by the European Patent Office for European Patent Application No. No. 16 199 794.5, dated Mar. 13, 2020.

Bai et al. "Fabrication of GaAs-on-Insulator via Low Temperature Wafer Bonding and Sacrificial Etching of Ge by XeF2", Journal of The Electrochemical Society, Dec. 28, 2011, Pages H183-190.

The extended European search report issued by the European Patent Office for European Patent Application No. 16160751.0, dated Sep. 22, 2016.

European Search Report issued by the European Patent Office for European Patent Application No. EP 16199794.5, dated May 24, 2017.

Communication pursuant to Article 94(3) EPC issued by the European Patent Office for European Patent Application No. 16199794.5, dated Feb. 5, 2021.

The extended European search report with European search opinion issued by the European Patent Office for European Patent Application No. 22159363.5, dated Jul. 21, 2022.

Winkler G. et al., "Mid-infrared monocrystalline interference coatings with excess optical loss below 10 ppm", Cornell University, Sep. 10, 2020.

* cited by examiner

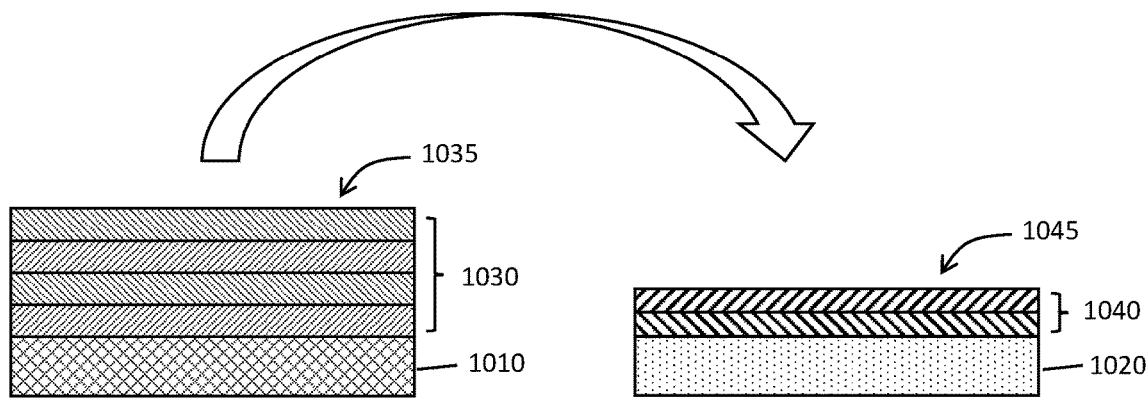
FIG. 10
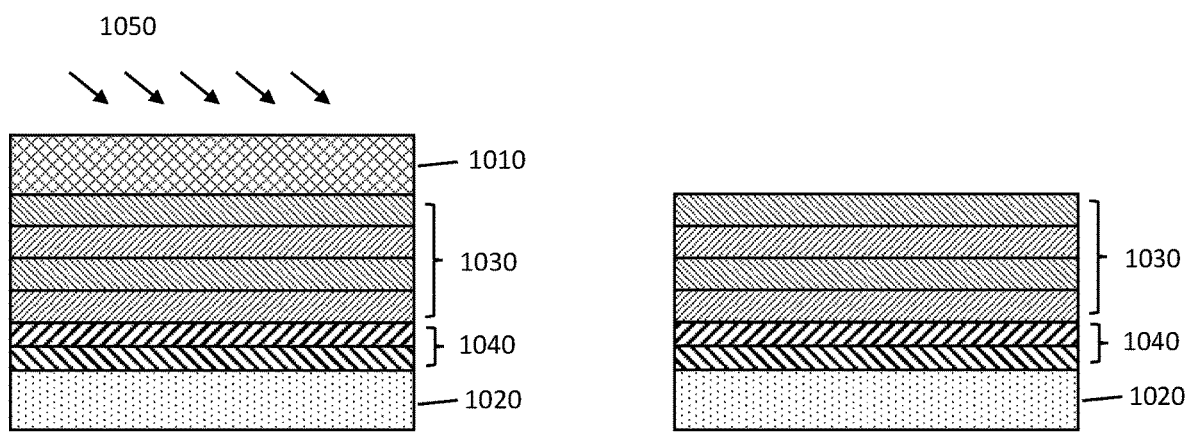
FIG. 11
FIG. 12

SUBSTRATE-TRANSFERRED STACKED OPTICAL COATINGS

CROSS REFERENCE TO RELATED APPLICATIONS

This application is a continuation in part of U.S. patent application Ser. No. 16/128,503 filed on Sep. 11, 2018. The disclosures of U.S. patent application Ser. No. 16/128,503 are hereby incorporated by reference.

FIELD OF THE PRESENT DISCLOSURE

The present disclosure relates to a method for manufacturing substrate-transferred stacked optical coatings.

BACKGROUND OF THE PRESENT DISCLOSURE

Highly reflective optical interference coatings are indispensable tools for modern scientific and industrial efforts. Systems with ultralow optical losses, namely parts-per-million, ppm, levels of scatter and absorption, were originally developed for the construction of ring-laser gyroscopes in the late 1970s, cf. U.S. Pat. No. 4,142,958. As an outcome of this, ion-beam sputtering, IBS, has been established as the gold standard process technology for generating ultralow-loss reflectors in the visible and near infrared, NIR. Typically, such multilayers consist of alternating layers of amorphous metal-oxides, most commonly high index $Ta_2O_5$, tantala, and low index $SiO_2$, silica, thin films, finding application in narrow-linewidth laser systems for optical atomic clocks, gravitational wave detectors, cavity QED, and tests of fundamental physics. Limitations of these amorphous coatings include excess Brownian noise, negatively impacting the limiting performance of precision optical interferometers, poor thermal conductivity, typically below 1 $Wm^{-1}K^{-1}$, as well as significant levels of optical absorption for wavelengths beyond 2 μm, excluding the operation of such low-loss reflectors in the mid-infrared, MIR. The latter limitation means that the highest performing metal oxide structures, while exhibiting phenomenal performance in the visible and NIR, cannot operate with low losses in this important long-wavelength region (for wavelengths significantly longer than 2 μm) and thus requires a switch to amorphous II-VI, group IV, or IV-VI compounds which are less well developed.

EP 11010091 discloses a mirror assembly based on a monocrystalline Bragg mirror bonded to a curved carrier substrate and a process of manufacturing the mirror assembly. Additionally, EP 11010091 describes an optical resonator system including a pair of such mirror assemblies forming an optical cavity for application in optical precision measurement systems. Processes disclosed therein proved very robust from a manufacturing point of view and have been proven to yield a number of improved performance metrics when compared with IBS-deposited amorphous metal oxide coatings. The proven advantages of these crystalline coatings, which are based on substrate-transferred GaAs/AlGaAs multilayers, include a significant reduction in Brownian noise when compared with typical dielectric mirror systems, with demonstrated loss angles $<4\times10^{-5}$ at room temperature and the potential for $\sim5\times10^{-6}$ at cryogenic temperatures near 10 K, a superior thermal conductivity of at least 30 $Wm^{-1}K^{-1}$ compared with 1 $Wm^{-1}K^{-1}$ for low-optical-loss $Ta_2O_5/SiO_2$ multilayers, and finally the ability to realize ppm-level optical absorption losses for wavelengths in the 1 μm to 10 μm range.

These monocrystalline coatings are typically grown via molecular beam epitaxy, where the total thickness is effectively limited to ~15-20 μm due to technological restrictions including significant drift of the growth rate during such long (>20 hours) crystal growth runs, inherent build-up of strain due to lattice mismatch, as well as the accumulation of surface defects within such a thick structure. As a consequence of these issues, the quality and ultimate optical performance typically degrades for very thick single-crystal coatings. However, thicker coatings having a thickness at or beyond 20 μm are necessary for ultra-high reflectivity mirrors, in particular for the mid-infrared spectral region for mirror center wavelengths in excess of 2 μm.

Given the rapidly expanding interest in such low-noise and low optical loss end mirrors at these long operating wavelengths, primarily in the region from 2 to 10 μm, further improvements of the optical performance of these substrate-transferred crystalline coatings, particularly the position dependence of the optical scatter losses, is now in high demand from the ultimate end users.

SUMMARY OF THE PRESENT DISCLOSURE

The present disclosure provides an alternative solution to overcome the above-mentioned limitations, namely a means to reduce the overall optical losses and improve the position dependence of the coating optical properties. With the use of crystalline multilayers of high mechanical quality, it also serves to significantly reduce the Brownian noise of the mirror materials while simultaneously exhibiting optical performance on par with IBS deposited multilayer mirrors, with the benefit of extending these performance metrics into the mid-infrared spectral range.

Within the present disclosure, the term crystalline, single crystal or monocrystalline refers to a low defect density single-crystal film as can be produced via epitaxial growth techniques, such as molecular beam epitaxy, MBE; metalorganic vapor phase epitaxy, MOVPE; liquid phase epitaxy, LPE; etc. In this application the terms crystalline and monocrystalline may be used interchangeably. It is important to note that a single crystal or monocrystalline material structure will still exhibit a finite number of defects or dislocations. However, a monocrystalline material does not contain grain boundaries and defects associated with said boundaries, separating neighboring crystallites of varying orientation in a polycrystalline sample.

Within the present disclosure the term low absorption should be understood to indicate an optical absorption level with a maximum upper limit of 100 ppm. Preferably, this may be reduced to <10 ppm or even into the range below 1 ppm.

Within the present disclosure, the term "dielectric multilayer coating" corresponds to a "thin film coating" which may also be referred to as a "multilayer mirror." The term mirror assembly refers to the multilayer coating together with the substrate.

Within the present disclosure the term host substrate should be understood as a synonym for donor substrate as well as growth substrate.

The present disclosure provides a method for manufacturing substrate-transferred optical coatings, including: a) providing a first optical coating on a first host substrate as the base coating structure; b) providing a second optical coating on a second host substrate; c) directly bonding the optical coating of the base coating structure to the second optical coating, thereby obtaining one combined coating; d) detaching one of the first and/or the second host substrates from the combined coating.

In the method of the present disclosure the coating structure includes two or more individual multilayers that are combined together to form a single transferred optical interference coating, called the combined coating. Thus, at least two individual coating structures are stacked in a separate processing step in order to generate one final coating structure by exploiting direct-bonding technology.

By applying this stacking procedure, monocrystalline optical interference coatings with essentially arbitrary thickness can be manufactured. Furthermore, multi-material coatings may be realized allowing for arbitrary mixtures of single-crystal and non-crystalline coating materials as components of the combined coating. Here, the mixed material coatings are referred to as "hybrid" coatings.

The bonding or stacking step may also be viewed as follows. Both the first host substrate and the first coating, being of finite thickness, are composed of two surfaces, one of which may be identified as the top surface of the respective substrate, the other as the bottom surface. For both the first host substrate and the first coating, one of the two surfaces of each substrate will be chosen as the surface on which further work is applied. That surface will then be identified as being the top surface of the host substrate and the coating respectively.

Bonding the first optical coating to the second optical coating may also be viewed as flipping, whereby one of the first or the second optical coatings is turned over by 180 degrees such that the two coatings come face to face and then are attached by a direct bonding process.

The stacking process employed reduces the impact of scatter loss that may be driven by growth defects on the surface of the multilayer. After stacking, such defects would be buried at the bonding interface below the surface. Growth defects are detrimental for the quality of the bond with the optical substrate. Growth defects can cause voids and thus have a negative influence on the wavefront error. Buried growth defects have less influence on the wavefront error in stacked optical coatings as higher quality bond interfaces can be achieved with planar samples, e.g., high pressure can be uniformly applied for planar geometries.

In the method as described above, the first host substrate and the second host substrate may be substantially similar.

Alternatively, in the method as described above, the first host substrate and the second host substrate may differ in thickness and/or material.

In the method as described above, the first optical coating and the second optical coating may be substantially similar or even from the very same growth run in a multi-wafer deposition system.

In the method as describe above, at least one second optical coating may differ from the first optical coating in thickness and/or material.

Thus, identical source wafers may be employed for achieving arbitrary thickness. Alternatively, different source wafers, e.g., different host substrates, amorphous/crystalline, electro-active/passive structures etc., may be applied and different multilayer structures may be used according to the needs of the application.

In the method as described above, the first optical coating and/or the second optical coating may be a single-crystal optical coating, wherein the step of forming the first optical coating and/or the second optical coating on the respective first or second host substrate may include depositing the first optical coating and/or the second optical coating, respectively, via an epitaxial growth technique, for example molecular beam epitaxy, MBE, or organometallic vapor-phase epitaxy.

In the method as described above, the step of forming the first and/or the second optical coating may further include lithographically defining the lateral geometry of the first and/or the second optical coating.

In the method as described above, the step of forming the first and/or the second optical coating may further include extruding the defined lateral geometry of the first and/or the second optical coating and at least partially into the respective first and/or second host substrate by means of chemical etching; or the step of forming the first and/or the second optical coating may further include singulating the first and/or the second optical coating using mechanical dicing and/or grinding processes and removing remaining substrate off the respective optical coating via selective chemical etching.

In the method as described above, the step of directly bonding the optical substrate to the combined coating may further include: pressing the combined coating into direct contact with the optical substrate surface using a press, thereby obtaining a bond between the combined coating and the optical substrate, wherein if the optical substrate has a concave surface using a convex press of equal and opposite or smaller radius of curvature, else if the optical substrate is planar using a planar press; wherein the pressing may be realized by clamping together the optical substrate, optical coating, and the press at a controlled pressure value; and optionally further including annealing of the bonded optical substrate for example at a temperature between 70° C.-300° C. and for times spanning one to twenty four hours; and optionally removing any remaining host substrates post-bonding by means of chemical etching.

In the method as described above, the optical substrate may be curved having a radius of curvature, ROC, between 0.1 m and 10 m or between 0.5 km and 10 km.

In the method as described above, the first host substrate may include GaAs, Ge, or Si; and the optical substrate may be transparent, in particular at a wavelength of 1064 nm or 1550 nm, or for MIR wavelengths between 2 and 10 µm and wherein the top surface of the optical substrate may be polished.

In the method as described above, the optical substrate may include $SiO_2$, sapphire, ultra-low expansion glass, ULE, Si, Ge, and ZnSe.

In the method as described above, the optical coating may include crystalline semiconductor layers being monocrystalline epitaxial layers based on an AlGaAs ternary alloy, wherein the first and second type may include $Al_xGa_{1-x}As$ with $0<x<1$; wherein for the layers of the first type x is smaller than for layers of the second type.

In a stacked structure, the individual components of the coatings may consist of monocrystalline materials with different lattice constants, e.g., GaAs-based, InP-based, GaN-based materials etc., or a combination of these, as well as fully amorphous materials, polycrystalline materials, or mixtures of each. This additional degree of freedom enables the design of advanced passive and active features of structures as well as optical coatings that cannot be realized with a single material platform.

The present disclosure further provides a direct-bonded optical coating obtained by the manufacturing method as described above.

The above and other aspects, features and advantages of the present disclosure will become more apparent from the following detailed description when taken in conjunction with the accompanying drawings.

In summary, this disclosure covers the production of separately stacked coatings for a subsequent substrate-transfer step in order to transfer the previously stacked coating onto arbitrary substrates. The stacking procedure allows for various technological barriers to be overcome, including limitations of the total thickness for various crystal growth techniques as employed for the production of ultralow-loss optical coatings, as well as reductions in defect densities that may degrade the final performance of the optic. Both the optical quality and surface quality are necessary for the substrate-transfer coating process, or also to combine two different coating materials or structures including monocrystalline materials with different lattice constant, various amorphous and polycrystalline materials, electro-optically passive and active structures, or combinations therein.

Another embodiment of the present disclosure provides a method for manufacturing hybrid optical coatings or hybrid mirror assemblies, including: a) providing a first optical coating having layers of alternating high and low refractive indices of crystalline materials on a first host substrate via an epitaxial growth technique; b) providing a second optical coating having layers of alternating high and low refractive indices of dielectric materials on a second host substrate via a physical vapor deposition (PVD) technique; c) directly bonding the first optical coating to the second optical coating; and d) removing the first host substrate.

Another embodiment of the present disclosure provides a method for manufacturing hybrid coatings using an alternative technique, including: a) providing a first optical coating having multiple layers of alternating high and low refractive indices of crystalline materials on a first host substrate via an epitaxial growth technique; b) providing a second optical coating having multiple layers of alternating high and low refractive indices of dielectric materials on the first optical coating via a physical vapor deposition (PVD) technique; c) directly bonding the second optical coating to a second host substrate; and d) removing the first host substrate.

Another embodiment of the present disclosure provides a hybrid optical coating including: a substrate; a first optical coating deposited on the substrate; and a second optical coating bonded on the first optical coating; wherein the first optical coating includes multiple layers of alternating high and low refractive indices of dielectric materials; and wherein the second optical coating includes multiple layers of alternating high and low refractive indices of crystalline materials.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout several views.

FIG. 10: A schematic view of the start of the manufacturing process steps according to the present disclosure.

FIG. 11: A schematic view of a subsequent process according to the present disclosure.

FIG. 12: A schematic view of an optical coating according to the present disclosure.

DETAILED DESCRIPTION

Figure 1:
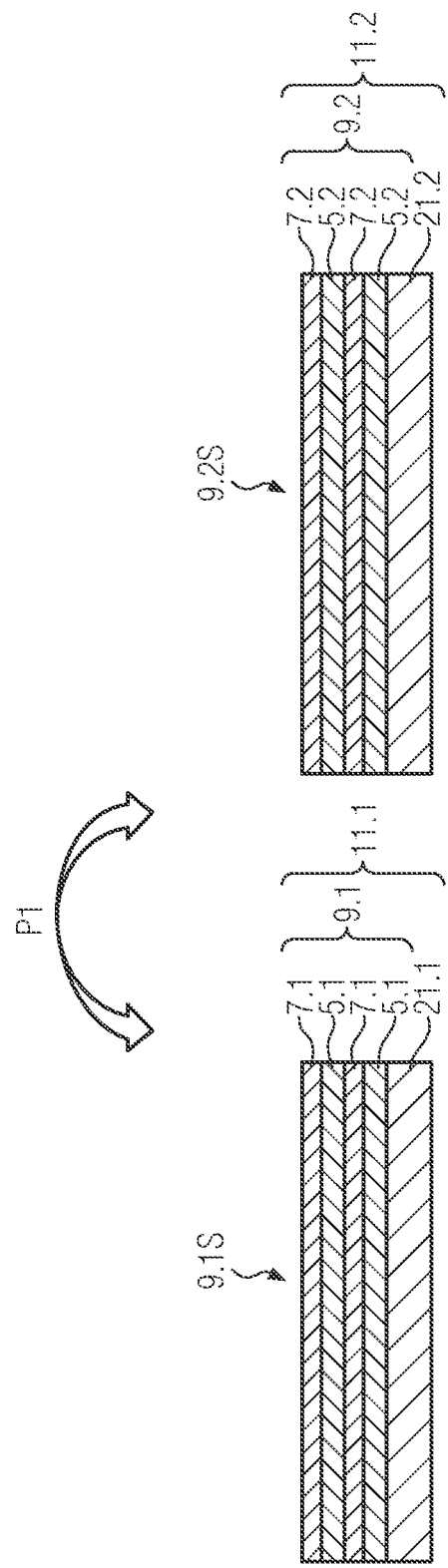
FIG. 1: A schematic view of the start of the manufacturing process steps according to the present disclosure.

FIG. 1 illustrates a side view of an optical coating 9.1 provided on a host substrate 21.1 which form a base coating structure 11.1. The optical coating 9.1 may be denoted as a first optical coating and the host substrate 21.1 may be denoted as a first host substrate. The optical coating 9.1 may include layers 5.1 and 7.1. In an oversimplified schematic drawing the optical coating 9.1 is illustrated having only four layers 5.1, 7.1, respectively, provided in an alternating way. It should be understood, however, that the coating 9.1 typically includes many more layers. The maximum reflectivity of the coating may be determined by the refractive index contrast of the individual layers, the total number of layers, as well as the refractive index of the substrate—asymptotically approaching a reflectivity of 100%. The number of layers for the present example may be about 40 pairs of layers, i.e., 80 total layers, but other numbers of layers such as 100-120 total layers may be used for such a structure. The layers 5.1 and 7.1 as shown in FIG. 1 are monocrystalline semiconductor layers alternating with respect to having a high and a low index of refraction, respectively. In FIG. 1, it may be assumed that layers 5.1 correspond to the layers having a low index of refraction whereas layers 7.1 correspond to the layers having a high index of refraction. Typically, the difference in refractive index should be as large as possible; for example, with AlGaAs at a wavelength of 1064 nm index values of 3.48 and 2.94 may be used for an implementation made from GaAs and $Al_{0.92}Ga_{0.08}As$ layers respectively. The stack of layers 5.1 and 7.1 form a coating 9.1 that in combination with the host substrate 21.1 form the base coating structure denoted by reference sign 11.1.

The coating 9.1 of FIG. 1 is provided onto the host substrate 21.1 via a suitable deposition technique. For example, the optical coating 9.1 may be a single-crystal multilayer as can be produced via epitaxial growth techniques, MBE, MOVPE, LPE, etc. The coating 9.1 may include a monocrystalline Bragg mirror. It should be understood that the term monocrystalline refers to a low defect density single-crystal film. Throughout this text, the terms crystalline and monocrystalline may be used interchangeably.

The host substrate 21.1 may be a semiconductor wafer. Said semiconductor wafer may be a standard wafer having a standard wafer size. Additionally, or alternatively, the host substrate 21.1 may include monocrystalline GaAs, germanium, Ge, or silicon, Si, InP, InSb, or $BaF_2$, although other materials may also be possible, depending on the desired operating wavelength for the application. Such materials may additionally include InP, or GaN/AlN. The thickness of the growth substrate is typically around 300-500 µm though values between 50 µm and 1 mm are possible.

FIG. 1 further discloses a side view of another optical coating 9.2 provided on a host substrate 21.2 which form another or second coating structure 11.2. The optical coating 9.2 may be denoted as a second optical coating and the host substrate 21.2 may be denoted as a second host substrate. The optical coating 9.2 may include layers 5.2 and 7.2. As indicated in FIG. 1 the number of layers 5.2 and 7.2 may be the same as for the base coating structure 11.1. Also, the sequence of layers 5.2 and 7.2 as well as their parameters may be the same as for the first optical coating 9.1, such that the coating structure 11.2 is similar or even equal to coating structure 11.1. This then provides a starting point for accumulating arbitrary coating thickness as will be described, below.

In another example the coating structure 11.2 may differ from the first coating structure 11.1. The difference between the coating structure 11.1 and 11.2 may then include different materials and/or different thicknesses of the host substrate 21.2 as compared to the host substrate 21.1. Additionally, or alternatively the host substrates 21.1 and 21.2 may be similar or equal and instead the layers 5.1 and 7.1 of the optical coating 9.1 may be different from the layers 5.2 and 7.2 of the optical coating 9.2. This then describes a starting point for using different source wafers as host substrates, such as amorphous and/or crystalline structures, electroactive and/or passive structures etc. Thus, for this example, in a stacked structure, the individual components of the coating may consist of monocrystalline materials with different lattice constants, e.g., GaAs-based, InP-based, GaN-based materials etc. or a combination of these, as well as fully amorphous materials, polycrystalline materials, or mixtures of each. This additional degree of freedom enables the design of advanced passive and active features of structures as well as optical coatings that cannot be realized with a single material platform.

FIG. 1 further indicates a double arrow P1 which should indicate that the base coating structure 11.1 is to be bonded to the second coating structure 11.2. The double arrow P1 indicates that it is an arbitrary choice whether to bond the structure 11.1 to the structure 11.2 or vice versa. The first coating structure 11.1 has a top surface—or free surface—9.1S facing away from the first host substrate 21.1 and the second coating structure 11.2 similarly has a top surface 9.2S facing away from the respective host substrate 21.2. Bonding the base coating structure 11.1 to the second coating structure 11.2 thus means bonding the first optical coating 9.1 to the second optical coating 9.2. This means that the top surface 9.1S of the first optical coating 9.1 is bonded to the top surface 9.2S of the second optical coating 9.2.

FIG. 1 further indicates a double arrow P1 which should indicate that the base coating structure 11.1 is to be bonded to the second coating structure 11.2. The double arrow P1 indicates that it is an arbitrary choice whether to bond the structure 11.1 to the structure 11.2 or vice versa. The first coating structure 11.1 has a top surface—or free surface—9.1S facing away from the first host substrate 21.1 and the second coating structure 11.2 similarly has a top surface 9.2S facing away from the respective host substrate 21.2. Bonding the base coating structure 11.1 to the second coating structure 11.2 thus means bonding the first optical coating 9.1 to the second optical coating 9.2. This means that the top surface 9.1S of the first optical coating 9.1 is bonded to the top surface 9.2S of the second optical coating 9.2.

FIGS. 2-10 illustrate schematically process steps according to the present disclosure.

FIG. 1 further indicates a double arrow P1 which should indicate that the base coating structure 11.1 is to be bonded to the second coating structure 11.2. The double arrow P1 indicates that it is an arbitrary choice whether to bond the structure 11.1 to the structure 11.2 or vice versa. The first coating structure 11.1 has a top surface—or free surface—9.1S facing away from the first host substrate 21.1 and the second coating structure 11.2 similarly has a top surface 9.2S facing away from the respective host substrate 21.2. Bonding the base coating structure 11.1 to the second coating structure 11.2 thus means bonding the first optical coating 9.1 to the second optical coating 9.2. This means that the top surface 9.1S of the first optical coating 9.1 is bonded to the top surface 9.2S of the second optical coating 9.2.

By combining the first coating structure 11.1 and the second coating structure, it is also possible that a majority of growth defects may become buried at the bonding interface between the two structures instead of the top layers facing outward after the combining step. Growth defects present at the surface have a negative influence on the optical scatter as well as the wavefront error. Buried growth defects have less influence on optical losses, including scatter, and may also have a reduced impact on the wavefront error in stacked optical coatings as a higher quality bond interfaces can be achieved with planar samples. Thus, by burying these defects it may be possible to have a reduction in the coating scatter loss to levels below 5 ppm, which is an improvement of a factor of 2-4 compared to previously applied processes.

Figure 3:
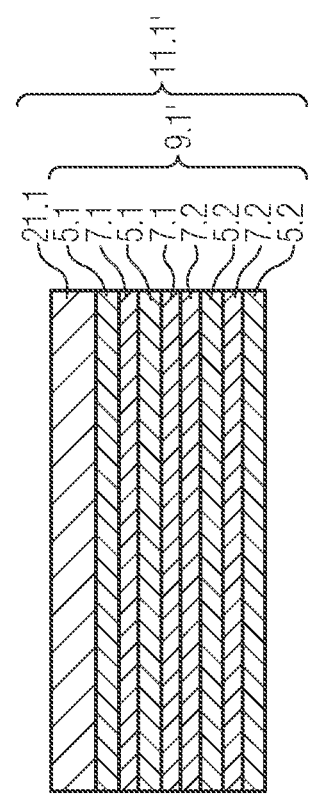
FIG. 3: A schematic view of subsequent process according to the present disclosure, illustrating an intermediate result.

FIG. 3 illustrates as subsequent processing step. FIG. 3 illustrates an intermediate result which may become final after evaluating a determining step. As illustrated in FIG. 3, one of the first and second host substrates 21.1 and 21.2 is removed from the combined coating structure. For illustrational purposes, FIG. 3 illustrates that the second host substrate 21.1 has been removed from the combined coating structure. That is, a removal or detaching step with regard to detaching one of the first and the second host substrates 21.1 and 21.2 is performed.

Figure 2:
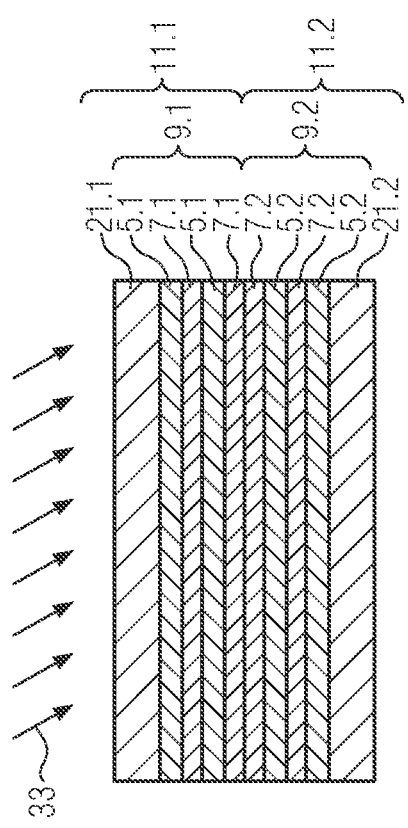
FIG. 2: A schematic view of a subsequent process according to the present disclosure.

The removal of the host substrate 21.2 may be achieved by a removal process 33 as indicated in FIG. 2. The removal process 33 may include at least one of wet-etching, grinding, lapping, etc. such that the host substrate 21.2 is detached from the respective optical coating 9.2. Previously described substrate removal processes such as epitaxial lift-off, ELO, or the Smart Cut process involving ion implantation and subsequent annealing may not be applicable for the production of such low loss coatings as depicted in FIG. 2. ELO is not compatible with low index ternary $Al_xGa_{1-x}As$ alloys, i.e., for x>50%, while the ion implantation step required in the Smart Cut process may prove damaging to highly sensitive multilayers. Thus, the donor substrate removal process may include a first step of mechanically thinning the host substrate 21.2 by, for example, a grinding process. Then, the host substrate 21.2 material may be chemically removed from the combined optical structure, i.e., from the optical coating 9.2, thereby obtaining a resulting combined optical structure 11.1' of which one of the two host substrates, 21.1 or 21.2, has been detached. As pointed out above, for illustrational purposes, FIGS. 2 and 3 choose to illustrate that host substrate 21.2 is selectively detached.

The process step illustrated in FIG. 3 is followed by a determining step. The determining step refers to the parameters of the resulting combined optical structure, here 11.1', of the previous step. The determining step determines whether or not the resulting combined optical structure 11.1' fulfills a predetermined condition. The predetermined or predefined condition may include whether a thickness of the combined coating 11.1' is larger, i.e., thicker, than a predefined thickness or else the predefined condition may include whether a predefined number n of repetitions of the previous steps has been performed, where n is a positive integer larger than or equal to 1. In particular, having a known thickness of the first optical coating 9.1 and the second optical coating 9.2, repeating the above steps n times will accumulate a combined coating having a corresponding thickness which adds up from the individual thicknesses of the optical coatings 9.1 and 9.2, respectively.

In case the result of the determining step is negative, meaning that the predetermined condition has not been fulfilled, the process flow continues with the following steps.

Figure 4:
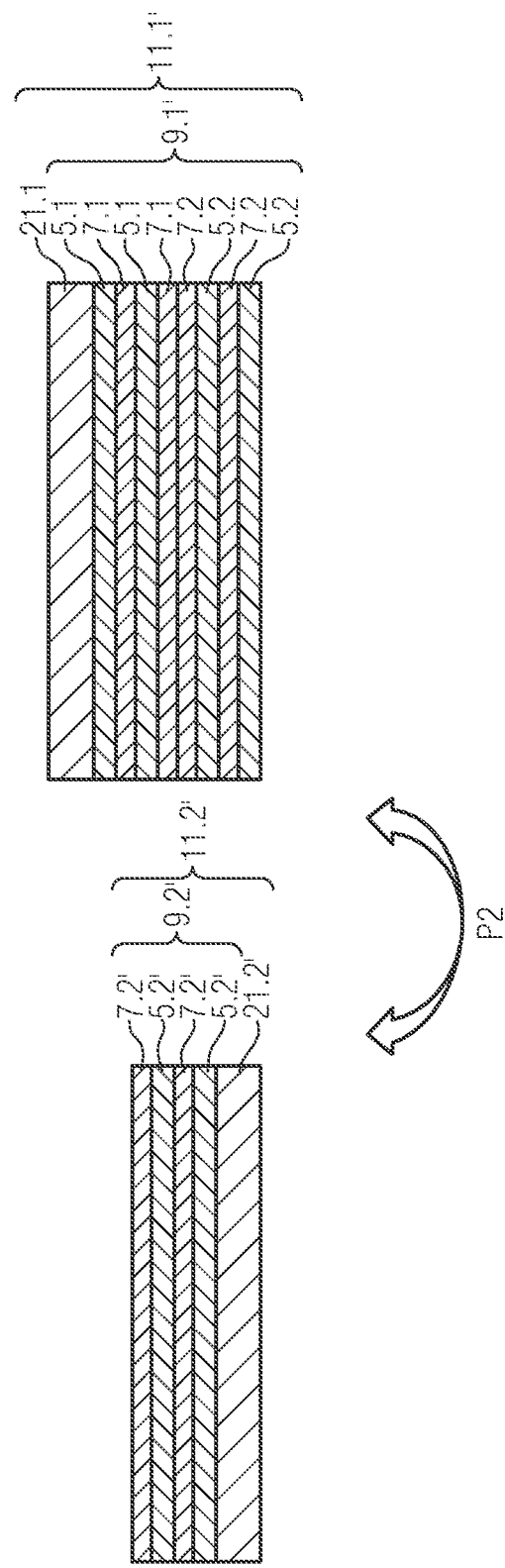
FIG. 4: A schematic view of a subsequent process indicating a further iteration according to the present disclosure.

FIG. 4 illustrates an immediate next step in case the determining step results to be negative. In FIG. 4, the resulting combined coating structure 11.1' as shown in FIG. 3 is taken to be the next, effective base coating structure. Likewise, as illustrated in FIG. 4 it is provided another optical coating 9.2' provided on another host substrate 21.2' which together form another or coating structure 11.2'. The optical coating 9.2' may include layers 5.2' and 7.2'. As indicated already in FIG. 1 the number of layers 5.2' and 7.2' may be the same as for the first coating structure 11.1 of FIG. 1, but now the coating structure 11.1' typically has more layers than the coating structure 11.2'. Also, as already indicated above the sequence of layers 5.2' and 7.2' as well as their parameters may be the same as for the first optical coating 9.1, such that the coating structure 11.2' is similar or even equal to the first coating structure 11.1 of FIG. 1. Alternatively, as described above, the coating structure 11.2' may differ from the coating structure 11.1 of FIG. 1. Thus, the effective base coating structure 11.1' as well as another coating structure 11.2' of FIG. 4 provide a pair of effective coating structures to be combined as indicated by the double arrow P2 of FIG. 2. In other words, the step as illustrated in FIG. 4 resembles the step of FIG. 1 but with a different base coating structure.

Figure 5:
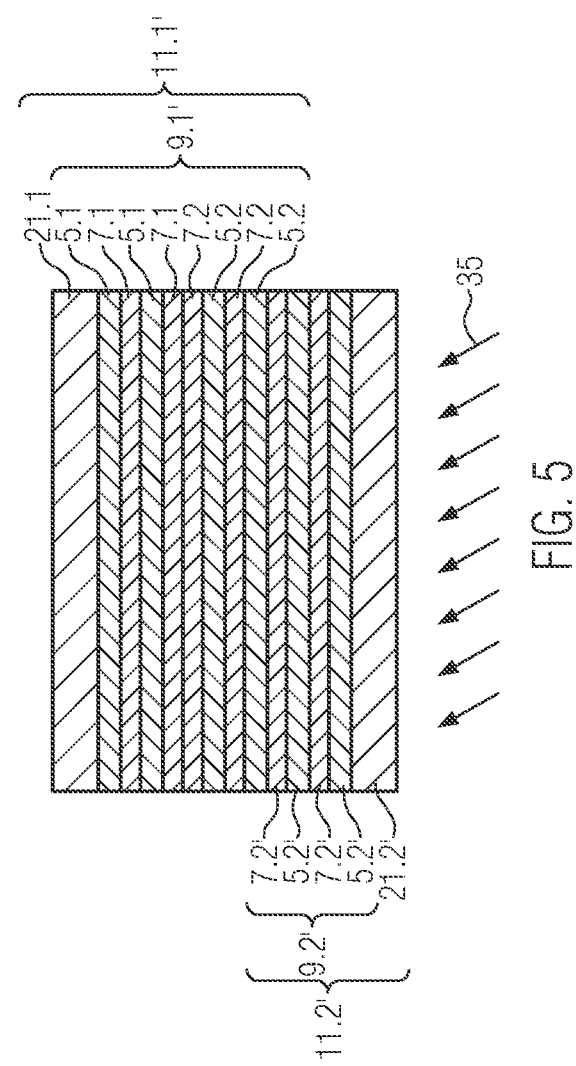
FIG. 5: A schematic view of a subsequent process according to the present disclosure.

FIG. 5 illustrates a subsequent step of the process flow following the step illustrated in FIG. 4, i.e., under the condition that the result of the determining step was negative. FIG. 5 resembles FIG. 2 by illustrating a combination of coating structure 11.1' and 11.2'. As described with respect to FIGS. 1 and 2, combining coating structures 11.1' and 11.2' is achieved by a direct bonding step. The direct bonding step may typically be the same as described for FIGS. 1 and 2 such that its description will not be repeated here. Further, and also similar as in FIG. 2, the bonding step is to be followed by a removal step 35 so as to remove the host substrate 21.2' from the structure shown in FIG. 5. The removal step 35 typically may be of the same kind as described with respect to FIG. 2 and thus will not be described here, again.

As indicated above, by combining the current base coating structure 11.1 and another second coating structure, it is possible that a majority of growth defects may become buried at the bonding interface between the two structures instead of the top layers facing outward after the combining step. This again may lead to a reduction in the coating scatter loss to levels below 5 ppm, which is an improvement of a factor of 2-4 compared to previously applied processes.

Figure 6:
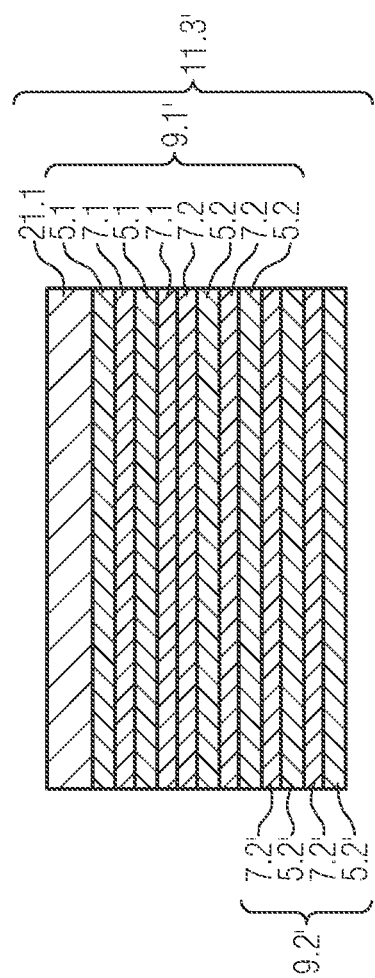
FIG. 6: A schematic view of subsequent process according to the present disclosure, illustrating an intermediate result.

FIG. 6 illustrates a subsequent step following the step illustrated in FIG. 5. After the removal step 35 of FIG. 5, it is obtained a current resulting combined optical structure 11.3'. The current resulting combined optical structure 11.3' thus has a larger thickness than the corresponding resulting combined optical structure obtained after having performed the step illustrated in FIG. 3.

Therefore, the determining step as was performed after obtaining the result illustrated in FIG. 3 may now be performed, again. This determining step then may refer, again, to the parameters of the resulting combined optical structure, here 11.3', of the previous step. The determining step determines whether or not the resulting combined optical structure 11.3' fulfills the predetermined condition, i.e., the same predetermined condition as was posed with respect to FIG. 3. The predetermined or predefined condition thus again may include whether a thickness of the combined coating 11.3' is larger, i.e., thicker, than a predefined thickness or else the predefined condition may include whether a predefined number n of repetitions of the previous steps has been performed, where n is a positive integer larger than or equal to 1. For the latter, a respective counter counting the number of iterations has to be increased by 1. In particular, having a known thickness of the first optical coating 9.1 and the second optical coating 9.2, and thereby having a known thickness of the effective optical coating 9.1' and 9.2', respectively will accumulate a combined coating having a corresponding thickness which adds up from the individual thicknesses. Thus, by iterating the above described steps, monocrystalline coatings with essentially arbitrary thickness can be achieved. This includes thicker coatings which are necessary for ultra-high reflectivity mirrors, in particular for the mid-infrared spectral region, for mirror center wavelengths in excess of 2 µm.

In case the result of the determining step performed after FIG. 6 is still negative, the procedure will continue by taking the optical structure 11.3' as the current, effective base structure and adding another coating structure as described with respect to FIGS. 1 and 2 or likewise 4 and 5, respectively.

In case the result of the determining step performed after any of the previous steps is positive, the predetermined condition has been fulfilled. This then means that the desired thickness of the combined coating has been achieved and/or the predefined number of envisaged repetitions/iterations of the above steps has been reached. Then FIG. 7 indicates a subsequent step provided that the determining step yielded a positive result.

Figure 7:
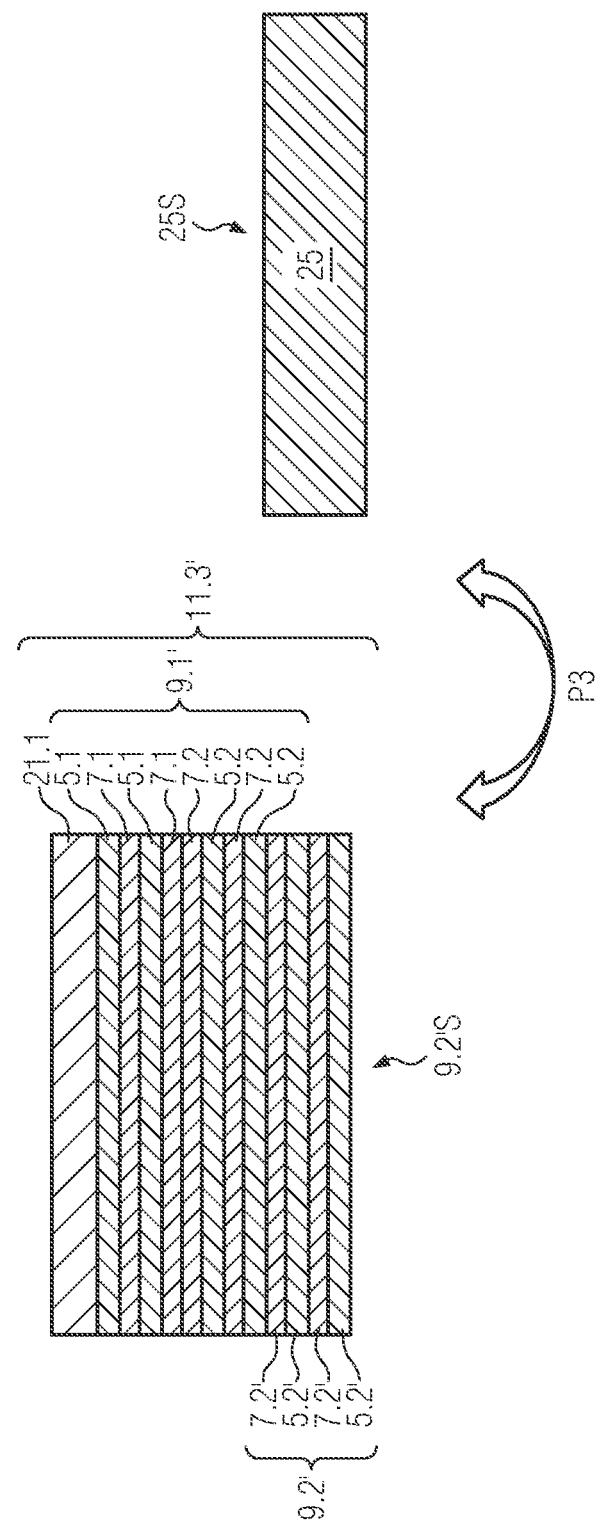
FIG. 7: A schematic view of subsequent process according to the present disclosure.

In FIG. 7 it is illustrated that the resulting combined optical structure 11.3' of FIG. 6, or likewise of FIG. 3, is provided alongside an optical substrate 25.

The optical substrate 25 of FIG. 7 has a top surface or working surface 25S of the optical substrate 25. This surface 25S may be polished. Likewise, the optical structure 11.3' has an outmost or free surface which here is denoted 9.2'. The surface 9.2' may also be polished. The optical structure 11.3' may then be combined with the optical substrate 25 by directly bonding the respective surfaces 9.2' and 25S, respectively. This is indicated by the double arrow P3.

Similar to the above illustrated coating-relevant bonding process, the bonding process between the combined optical structure 11.3' and the optical substrate 25 may involve direct bonding, i.e., with no intermediate adhesive layers. Again, growth defects which may be present at the surface 9.2' will be buried when bonding against the surface 25S of the optical substrate 25. To achieve proper bonding a press may be used. Thus, a defect-free bonding interface for the final substrate-transfer process onto the final optical substrate is advantageous for increasing manufacturing yield and also for suppressing wavefront errors caused by defect-induced voids at the coating-substrate interface.

Further, the entire structure shown in FIG. 7 can be annealed in order to generate a stronger bond between the structure 11.3' and the optical substrate 25. After pressing and annealing the structure 11.3' onto the optical substrate 25, the structure 11.3' has been firmly bonded to the optical substrate 25 thereby forming a mirror assembly 12. As is illustrated in FIGS. 7 and 8, the host substrate 21.1 is still attached to said mirror assembly 12.

Figure 8:
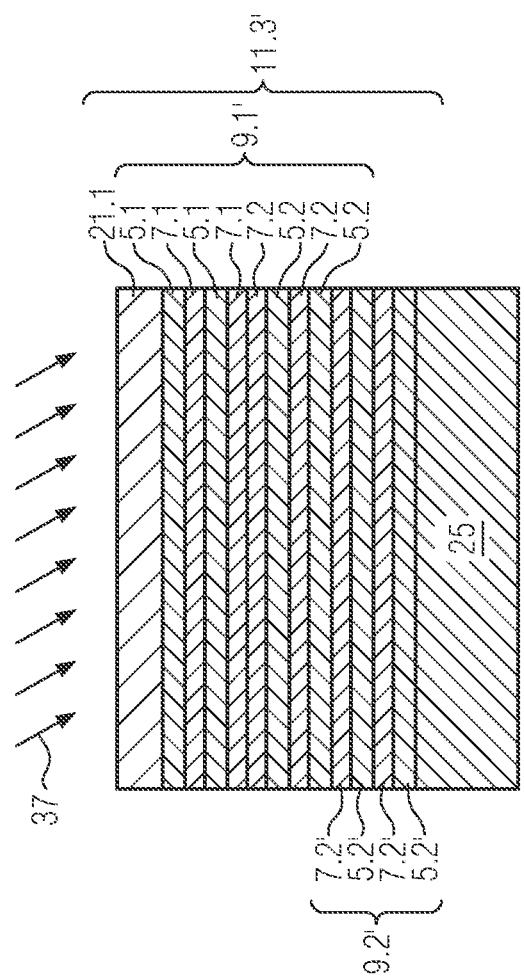
FIG. 8: A schematic view of subsequent process according to the present disclosure.

FIG. 8 illustrates a further step in which a removal process 37 is applied to remove the remaining host substrate 21.1 from the optical structure 11.3'. The removal process 37 may be similar as the removal process 33, and 35 described above.

Figure 9:
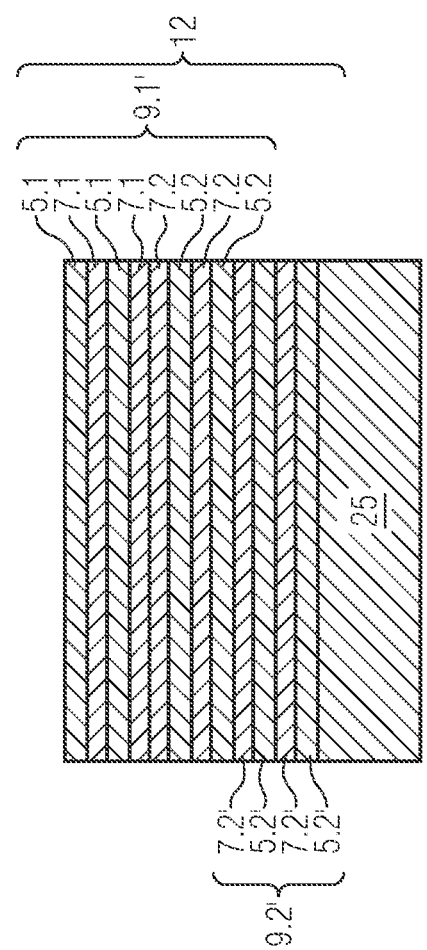
FIG. 9: A schematic view of subsequent process according to the present disclosure.

FIG. 9 illustrates the resulting transferred combined optical stack 12 on the optical substrate 25.

Whereas the above Figures have been shown with planar substrates, it should be understood that at least the optical substrate 25 may be also be chosen to be curved and may have a pre-determined radius of curvature between 0.1 and 10 m, with a typical value of 1 m, or a radius of curvature between 0.5 km and 10 km.

If the final application requires an extremely stable mirror structure with low optical losses and low Brownian noise, the coating should consist of a monocrystalline semiconductor multilayer. One potential example is AlGaAs-based coatings, which typically exhibit a limiting loss angle, i.e., the inverse of the mechanical quality factor, of a maximum of $1 \times 10^{-4}$ to a value below $10^{-5}$ depending on the system operating temperature. In addition, such coatings can typically provide a reflectivity >99.99%, with a total absorption <1 ppm for center wavelengths covering the near infrared spectral region, i.e., 1000-1600 nm. Typical values for center wavelengths are 1064 nm and 1550 nm, though the range of ~600 nm to ~10 µm is possible with GaAs/AlGaAs multilayers.

In summary, this disclosure covers the production of separately stacked coatings for a subsequent substrate-transfer step in order to transfer the previously stacked coating onto arbitrary substrates. The stacking procedure allows for various technological barriers to be overcome, including limitations of the total thickness for various deposition and/or crystal growth techniques as employed for the production of ultralow-loss optical coatings, as well as reductions in defect densities that may degrade the final performance of the optic. Additionally, the stacking process may enhance the optical quality and surface quality necessary for the substrate-transfer coating process, while also allowing for the combination of two different coating materials or structures including monocrystalline materials with different lattice constants, various amorphous and polycrystalline materials, electro-optically passive and active structures, or combinations therein.

Hybrid Optical Interference Coatings

The present disclosure provides another novel concept and process for manufacturing high-performance (i.e., low optical loss) hybrid infrared thin film optical interference coatings. An embodiment provides a single-crystal multilayer stack directly bonded to the surface of an amorphous multilayer stack deposited by physical vapor deposition (PVD). Such a combination of materials enables mirrors to be produced with excess optical losses (optical scatter+ absorption) at the part-per-million level, enabling mirror reflectivity >>99.99% over the wavelength range of roughly 2 µm to approximately 12 µm, while maintaining a commercially viable manufacturing method. This is a completely novel approach combining crystalline and amorphous materials to form a hybrid coating enabling completely new metrics in IR coatings at a reasonable cost.

Traditionally, optical interference coatings are based on stacks of thin dielectric layers directly deposited onto an appropriate optical substrate (for example, in the mid-IR range including highly polished $CaF_2$ among other materials) to form a highly reflective mirror assembly. These films are typically deposited using various evaporation or sputter technologies, generally referred to as PVD techniques. Such processes yield mirrors with modest reflectivity (up to 99.99%), ultimately limited by optical absorption and scatter at the few hundred part-per-million (ppm) (>>100 ppm) level in the mid- and long-wave infrared spectral region, which is defined here as 2 µm to approximately 12 µm.

As an alternative solution, previous efforts have focused on drastically reducing these limiting excess optical losses by employing substrate-transferred crystalline coatings. This unique class of optical interference coatings relies on a separate crystal or "epitaxial" growth process on a seed wafer (most commonly via molecular beam epitaxy, MBE), followed by patterning and etching of individual coating discs or coupons, and ultimately direct bonding (using no adhesive layers) the crystalline stack onto the final optical substrate to form the final mirror assembly. In addition to the present disclosure, this technology and manufacturing process is covered in detail in U.S. Pat. No. 9,945,996.

These so-called crystalline coatings or semiconductor supermirrors exhibit exceptional optical and thermomechanical properties owing to their high purity and near structural perfection as a consequence of their single-crystal nature.

However, challenges are encountered when extending this technology to long wavelengths, particularly in the mid- and long-wave infrared spectral region (2 µm to approximately 12 µm). For this intended wavelength range, the crystalline stack ends up extremely thick, since to obtain a maximized reflectivity for a given number of layers in the stack, each of the alternating layers ideally has an optical layer thickness corresponding to a quarter of the desired center wavelength of the mirror. In addition, the reflectivity may be further increased by increasing the number of layers in the stack. Hence, the longer the mirror center wavelength, the thicker such an optical interference coating with maximized reflectivity will become. As an example, for a roughly 5 µm center wavelength, a target reflectivity >99.99% would entail a crystalline coating thickness approaching 30 µm. High quality epitaxy is only possible for film stacks on the order of 10-15 µm in thickness. To get around this, the present disclosure describes the stacking of two crystalline multilayers (followed by the substrate transfer process to create the mirror assembly) in the previous sections above. As each sub-stack is within the thickness limit for high quality material, it is possible to generate ultralow-loss mirrors (with scatter and absorption <10 ppm). For example, Winkler et al., "Mid-infrared Interference Coatings with Excess Optical Loss below 10 ppm," OPTICA, Vol. 8, No. 5, pp 686-696, May 2021, discloses optical coatings capable of achieving a reflectivity >>99.99% in the mid-infrared spectral range from 2 µm to 12 µm.

However, this process suffers from poor yield (as two bonding steps are needed) and associated high costs, making it impractical for commercial production. Going to even longer wavelengths (for example beyond 4.6 µm as in the Winkler et al. paper) would require further sub-stack bonding processes, making these mirrors even more difficult to manufacture. Moreover, these mirrors exhibit a relatively narrow optical bandwidth owing to the limited refractive index contrast in the all-crystalline system. (See, for example, Wikipedia for definitions of "Refractive index contrast").

As a solution to these major technological and production challenges, an embodiment of the present disclosure provides a novel "stacked" coating solution, building off of that in U.S. App. 20200080231. Rather than the repeated stacking of crystalline multilayers as in those embodiments, this new approach combines a high index contrast but optically lossy, with nominally high absorption, amorphous thin film PVD base layer combined with a bonded crystalline coating cap. Although the lossy amorphous films may at first glance appear to limit the overall performance, it turns out that the crystalline surface layers predominantly provide the desired optical effects and thus absorption levels <10 ppm, can be maintained in a mirror with drastically simplified manufacturing, owing to the need for just a thin epitaxial growth process and a single bonding step.

The novelty of this proposal lies in the fact that, in a high-reflectivity optical interference coating, the vast majority of the optical intensity lies in the surface layers (see Dubravko et al., "Analytic Expressions for the Reflection Delay, Penetration Depth, and Absorptance of Quarter-Wave Dielectric Mirrors," IEEE Journal of Quantum Electronics, Vol. 28, No. 2, pp 514-524, February 1992), thus these are most important for controlling the optical performance (in terms of losses, driving the absorption and scatter). The remaining layers, i.e., the base layers, while necessary for contributing to the interference effects and pushing the total reflectivity towards a limiting value, here targeting >99.99%, only weakly contribute to the overall losses, given the low optical field strength at the surface layers. In this way, the much higher losses can be tolerated in the base layers, while still yielding coatings and mirror assemblies with <<100 ppm of scatter and absorption at these long wavelengths.

To manufacture such coatings and mirror assemblies, referred to here as "hybrid coatings" or "hybrid mirrors" when joined to a final optical substrate, an embodiment of the present disclosure provides a target optical substrate, deposits a dielectric coating on the target host substrate, then directly bonds a crystalline coating to the surface of the dielectric coating, generating an optical interference coating which is referred to as a "hybrid optical coating", with a comparably lossy base layer (dielectric coating, with high index contrast, thus being only a few micrometers thick) capped with a very low loss crystalline coating. The crystalline coating has a thickness well below 15 µm, maintaining high structural quality and low background absorption. Therefore, an embodiment of the present disclosure can generate high-performance mirrors in a much more manageable fashion, well beyond the optical performance of amorphous (PVD) dielectrics alone and approaching that of all-crystalline structures which have unwieldy production requirements in the wavelength range from 2 µm to 12 µm.

In one embodiment, the process involves pre-coating the target host substrate (e.g., including or consisting of silicon, Si or calcium fluoride, $CaF_2$) with the second optical coating via PVD and then transferring, via direct bonding, the separately grown crystalline coating, i.e. the first optical coating to the surface of the second optical coating. The crystalline coating direct bonding process is described in detail in "Direct-bonded optical coatings," EP 3219832A1 and "Substrate transferred monocrystalline Bragg mirrors," U.S. Pat. No. 9,945,996. To complete the hybrid optical mirror assembly, the first host substrate, which preferably is a growth wafer (e.g., including or consisting of at least one of: gallium arsenide, GaAs, germanium, Ge, silicon, Si, and indium phosphide, InP) on which the crystalline coating has been grown, is removed from the crystalline coating. FIG. 10 illustrates a side view of a first substrate 1010 and a second substrate 1020. A first optical coating 1030 having multiple layers of alternating high and low refractive indices is provided on the first host substrate 1010 via an epitaxial growth technique, such as molecular beam epitaxy or organometallic vapor-phase epitaxy. A second optical coating 1040 having multiple layers of alternating high and low refractive indices is provided on the second host substrate 1020 via a physical vapor deposition (PVD) technique. e.g., ion-beam sputtering, or evaporation. In an oversimplified schematic drawing the optical coatings 1030, 1040 are illustrated having only four and two layers respectively, provided in an alternating way. It should be understood, however, that an optical coating typically includes many more layers, and that the first optical coating may have more, fewer or the same number of layers as the second optical coating.

The arrow shown in in FIG. 10 further indicates that the first optical coating 1030 is to be directly bonded to the second optical coating 1040 to form a first-type intermediate hybrid structure. The first optical coating 1030 has a top surface 1035—or free surface—facing away from the first substrate 1010 and the second optical coating 1040 similarly has a top surface 1045—or free surface—facing away from the second substrate 1020. Bonding the first optical coating 1030 to the second optical coating 1040 means that the top surface 1035 of the first optical coating 1030 is bonded to the top surface 1045 of the second optical coating 1040. The various bonding techniques have already been discussed above.

FIG. 11 illustrates the first-type intermediate hybrid structure after the first optical coating 1030 is bonded to the second optical coating 1040. As illustrated in FIG. 11, the first host substrate is to be removed from the first-type intermediate hybrid structure. The removal of the first host substrate 1010 may be achieved by a removal process 1050 as indicated in FIG. 11. The various removal processes have already been discussed above.

FIG. 12 illustrates the hybrid optical mirror assembly after the removal process. This hybrid optical mirror assembly includes the second substrate 1020, the second optical coating 1040 provided on the second substrate, and the first optical coating 1030 directly bonded on top of the second coating 1040. The first and second optical coatings together form a hybrid optical coating.

Figure 13:
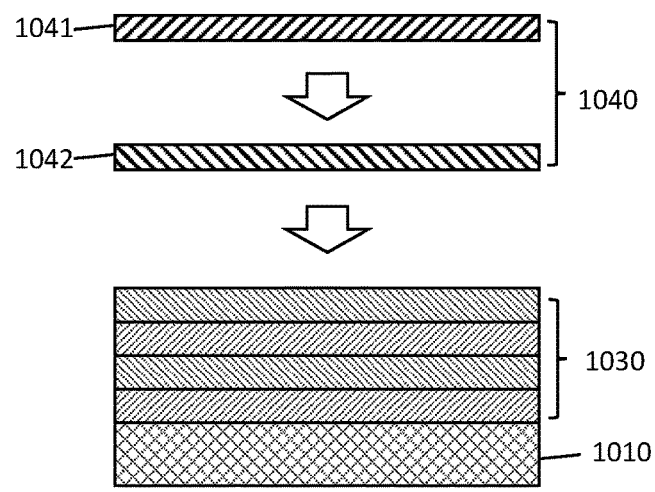
FIG. 13: A schematic view of the start of the manufacturing process steps according to the present disclosure.

In another embodiment, the process involves first depositing the dielectric coating, i.e. the second optical coating via PVD on the crystalline coating, i.e., on the first optical coating, which is separately grown on the first host substrate (e.g., including or consisting of at least one of: GaAs, Ge, Si, and InP), leading to a second-type intermediate hybrid structure, then flipping and directly bonding said second-type intermediate hybrid structure to a second host substrate (e.g., including or consisting of Si or $CaF_2$). Finally, as with above, the first host substrate is removed leaving a hybrid optical mirror consisting of the second host substrate, the PVD coating and the crystalline coating. FIG. 13 illustrates a first substrate 1010 coated with a first optical coating 1030 having layers of alternating high and low refractive indices onto which a second optical coating 1040 is to be deposited, the second optical coating 1040 having layers of alternating high and low refractive indices to form a second-type intermediate hybrid structure. In this case alternating high and low refractive indices layers 1041, 1042 are deposited directly on the first optical coating 1030 via PVD. Again, the optical coatings 1030, 1040 are illustrated in an oversimplified schematic drawing.

Figure 14:
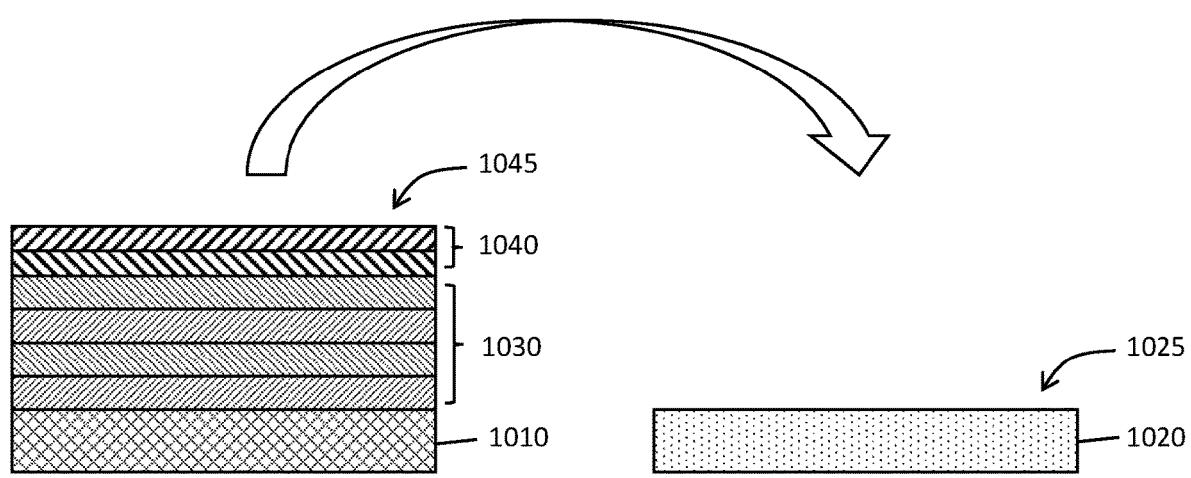
FIG. 14: A schematic view of a subsequent process according to the present disclosure.

FIG. 14 illustrates a side view of the second-type intermediate hybrid structure and a second host substrate 1020. FIG. 14 further indicates that the second-type intermediate optical hybrid structure is to be bonded to the second host substrate 1020 to form a first-type intermediate hybrid structure. In this case the top surface 1045—or free surface—of the second optical coating 1040 is directly bonded to the surface 1025 of the second substrate 1020. The first-type intermediate hybrid structure is already shown in FIG. 11. After the removal of the first host substrate 1010 by the process 1050, a hybrid optical mirror as shown in FIG. 12 is obtained.

The above embodiments disclose that a hybrid optical mirror is generated by combining a PVD (sputtered or evaporated) bottom coating on a base/target optical substrate, and capped with a thin crystalline coating, wherein the crystalline coating interacts with the vast majority of the optical intensity when the hybrid optical mirror interacts with optical radiation at a wavelength for which the hybrid optical coating was designed. Such a hybrid optical coating largely preserves the beneficial properties of all-crystalline coatings, while remedying the above noted shortcomings; challenges in stacking, and inferior bandwidth. These unique advantages are illustrated by the following examples.

EXAMPLE DESIGN 1

This design would be valid for a hybrid optical mirror assembly operating in the 2-5 μm spectral region; for example, 4.5 μm center wavelength mirror:
a) Polished Si base/target substrate (curved or planar with radii of curvature from 0.1 to ∞ m, preferably having a substrate thickness of 5-10 mm).
b) PVD stack forming the second optical coating, consisting of multiple layers of alternating high refractive index Si, with a refractive index of approximately 3.4, and low refractive index $SiO_2$, with a refractive index of approximately 1.4, deposited via a suitable PVD technique (for instance, ion-beam or magnetron sputtering).
c) GaAs/$Al_{0.92}Ga_{0.08}As$ crystalline stack forming an optical coating consisting of multiple layers of alternative layers of high refractive index GaAs, with a refractive index of 3.3, and low refractive index $Al_{0.92}Ga_{0.08}As$, with a refractive index of 2.9, grown by MBE on a GaAs wafer as a host substrate.

For a 4.5 μm center wavelength mirror, layer thicknesses are preferably chosen to be:
$1^{st}$ to $6^{th}$ layer: 3 times alternating Si—328.6 nm/$SiO_2$—822.6 nm
$7^{th}$ layer: Si—164.3 nm (single layer)
$8^{th}$ layer: GaAs—170.0 nm (single layer)
$9^{th}$ to $52^{nd}$ layer: 22 times alternating $Al_{0.92}Ga_{0.08}As$—388.6 nm/GaAs—340.0 nm (starting with $Al_{0.92}Ga_{0.08}As$)

Figure 15:
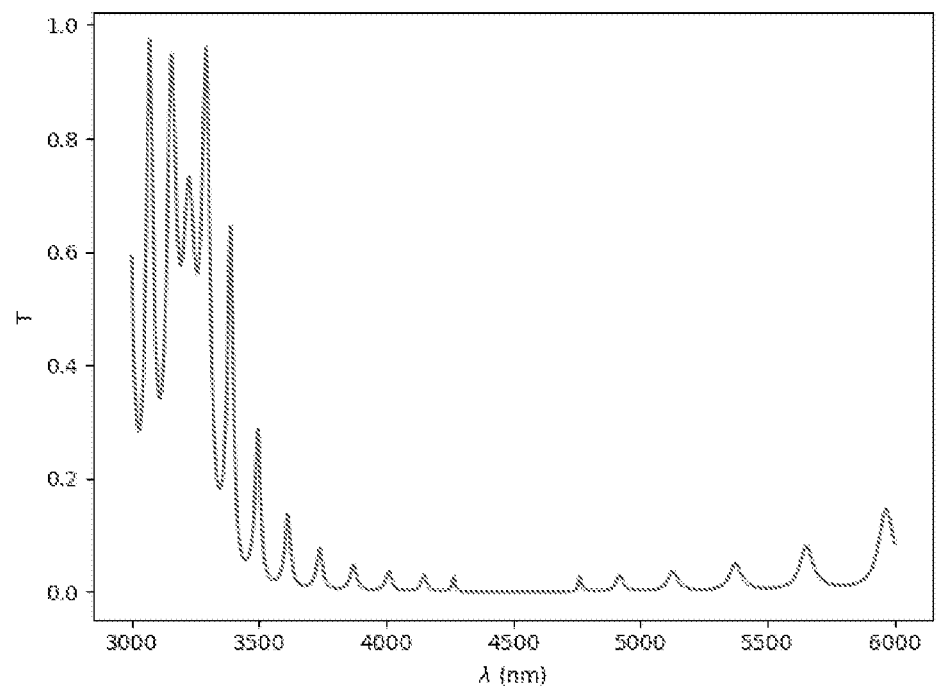
FIG. 15: A transmissivity graph of a mirror according to one embodiment of the present disclosure.

This hybrid optical coating yields a mirror with a transmission of 5.6 ppm and absorption of 12.3 ppm. With optical scatter of ~0 ppm given the long operating wavelength and low micro-roughness of the GaAs, the reflectivity (R) is $1-5.6\times10^{-6}-12.3\times10^{-6}=0.9999821$ (or 99.99821%). FIG. 15 shows a graph of the transmissivity (T) of this mirror.

EXAMPLE DESIGN 2

This design would be valid for a hybrid optical coating acting as a mirror in in the 2-12 μm spectral region; for example, 4.5 μm center wavelength mirror:
a) Polished Si base/target substrate (curved or planar with radii of curvature from 0.1 to ∞ m, preferably having a substrate thickness of 5-10 mm).
b) PVD stack consisting of multiple layers of alternating high refractive index Ge, with a refractive index of approximately 4.0, and low refractive index zinc sulfide, ZnS, with a refractive index of approximately 2.3, deposited via a suitable PVD technique (for instance, evaporation or sputtering).
c) GaAs/$Al_{0.92}Ga_{0.08}As$ stack forming an optical coating consisting of multiple layers of high refractive index GaAs, with a refractive index of 3.3, and low refractive index $Al_{0.92}Ga_{0.08}As$, with a refractive index of 2.9, grown by MBE on a GaAs wafer as a host substrate.

For a 4.5 μm center wavelength mirror, each of the multiple layers has a thickness which is preferably chosen to be:
$1^{st}$ to $8^{th}$ layer: 4 times alternating Ge—283.0 nm/ZnS—500.0 nm
$9^{th}$ layer: Ge—141.5 nm (single layer)
$10^{th}$ layer: GaAs—170.0 nm (single layer)
$11^{th}$ to $54^{th}$ layer: 22 times alternating $Al_{0.92}Ga_{0.08}As$—388.6 nm/GaAs—340.0 nm (starting with $Al_{0.92}Ga_{0.08}As$)

Figure 16:
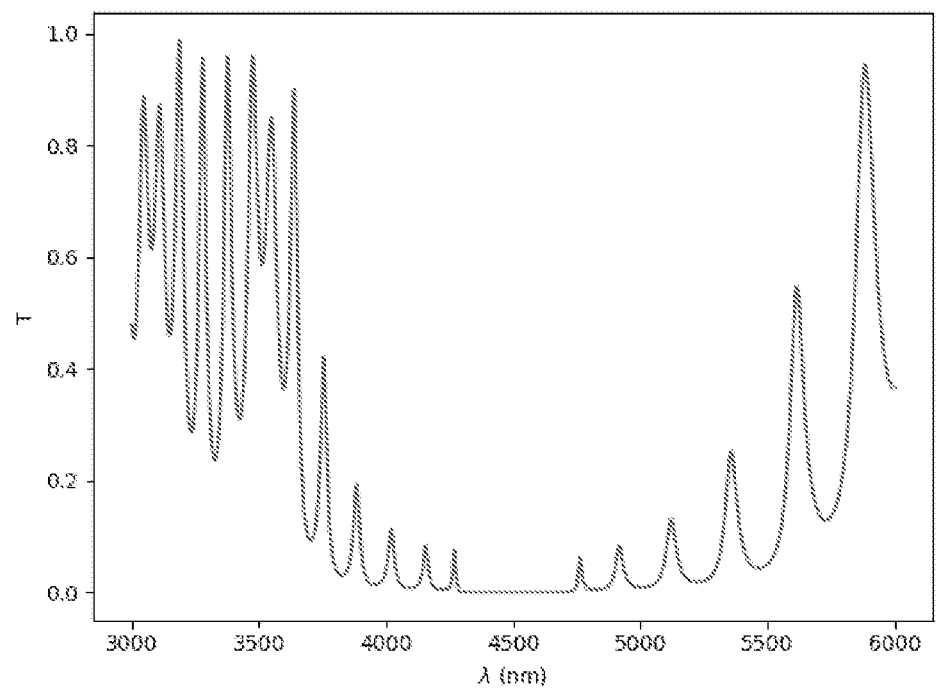
FIG. 16: A transmissivity graph of a mirror according to one embodiment of the present disclosure.

This hybrid optical coating yields a mirror with a transmission of 12.5 ppm and absorption of 12.1 ppm. With optical scatter of ~0 ppm, again given the long operating wavelength and low micro-roughness of the GaAs, the reflectivity (R) is $1-12.5\times10^{-6}-12.1\times10^{-6}=0.9999754$ (or 99.99754%). FIG. 16 shows a graph of the transmissivity (T) of this mirror.

These examples show that hybrid optical mirror with a reflectivity that is greater than 99.99% may be achieved, while the thickness of the crystalline coating stack is maintained to be less than 15 μm, ensuring excellent optical quality.

Note that the above numbers in the examples are for illustration purposes only. It is contemplated that, based on the present disclosure, a skilled person is able to choose suitable parameters for the optical coatings to meet some specific design requirements.

While the present invention has been described at some length and with some particularity with respect to the several described embodiments, it is not intended that it should be limited to any such particulars or embodiments or any particular embodiment, but it is to be construed so as to provide the broadest possible interpretation in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for manufacturing a hybrid optical mirror assembly, comprising:
   a) providing a first optical coating having multiple layers of alternating high and low refractive indices of crystalline materials on a first host substrate via an epitaxial growth technique;
   b) providing a second optical coating having multiple layers of alternating high and low refractive indices of dielectric materials on a second host substrate via a physical vapor deposition (PVD) technique;
   c) directly bonding the first optical coating to the second optical coating; and
   d) removing the first host substrate;
   wherein the multiple layers of alternating high and low refractive indices of crystalline materials comprise GaAs/AlGaAs layers, and the multiple layers of alternating high and low refractive indices of dielectric materials comprise $Si/SiO_2$ layers or Ge/ZnS layers.

2. The method of claim 1, wherein the first host substrate comprises at least one of: GaAs, Ge, Si, and InP.

3. The method of claim 1, wherein the second host substrate comprises Si or $CaF_2$.

4. The method of claim 1, wherein the PVD technique is ion-beam sputtering and/or evaporation.

5. The method of claim 1, wherein the epitaxial growth technique is molecular beam epitaxy or organometallic vapor-phase epitaxy.

6. A method for manufacturing a hybrid optical mirror assembly, comprising:
   a) providing a first optical coating having multiple layers of alternating high and low refractive indices of crystalline materials on a first host substrate via an epitaxial growth technique;
   b) providing a second optical coating having multiple layers of alternating high and low refractive indices of dielectric materials on the first optical coating via a physical vapor deposition (PVD) technique;
   c) directly bonding the second optical coating to a second host substrate; and
   d) removing the first host substrate;
   wherein the multiple layers of alternating high and low refractive indices of crystalline materials comprise GaAs/AlGaAs layers, and the multiple layers of alternating high and low refractive indices of dielectric materials comprise $Si/SiO_2$ layers or Ge/ZnS layers.

7. The method of claim 6, wherein the first host substrate comprises at least one of: GaAs, Ge, Si, and InP.

8. The method of claim 6, wherein the second host substrate comprises Si or $CaF_2$.

9. The method of claim 6, wherein the PVD technique is ion-beam sputtering and/or evaporation.

10. The method of claim 6, wherein the epitaxial growth technique is molecular beam epitaxy or organometallic vapor-phase epitaxy.

11. A hybrid optical mirror assembly comprising:
    a substrate;
    a first optical coating deposited on the substrate; and
    a second optical coating bonded on the first optical coating, thereby forming a hybrid optical coating;
    wherein the first optical coating comprises multiple layers of alternating high and low refractive indices of dielectric materials; and
    wherein the second optical coating comprises multiple layers of alternating high and low refractive indices of crystalline materials;
    wherein the multiple layers of alternating high and low refractive indices of crystalline materials comprise GaAs/AlGaAs layers, and the multiple layers of alternating high and low refractive indices dielectric materials comprise $Si/SiO_2$ layers or Ge/ZnS layers.

12. The hybrid optical mirror assembly of claim 11, wherein the substrate comprises Si or $CaF_2$.

13. The hybrid optical mirror assembly of claim 11, wherein the reflectivity of the hybrid optical mirror is greater than 99.99% and wherein the crystalline portion of the hybrid optical coating has a stack thickness less than 15 μm.

* * * * *